United States Patent
Yan et al.

(10) Patent No.: US 10,554,095 B2
(45) Date of Patent: Feb. 4, 2020

(54) AC MOTOR WITH REDUCTION MECHANISM

(71) Applicant: National Cheng Kung University, Tainan (TW)

(72) Inventors: Hong-sen Yan, Tainan (TW); Yi-chang Wu, Tainan (TW); Jian-liang Lin, Tainan (TW); Kuan-chen Chen, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 245 days.

(21) Appl. No.: 15/854,834

(22) Filed: Dec. 27, 2017

(65) Prior Publication Data

US 2018/0123426 A1    May 3, 2018

Related U.S. Application Data

(63) Continuation-in-part of application No. 14/304,956, filed on Jun. 15, 2014, now abandoned.

(51) Int. Cl.
| | |
|---|---|
| *H02K 7/116* | (2006.01) |
| *H02K 1/14* | (2006.01) |
| *H02K 1/24* | (2006.01) |
| *F16H 1/28* | (2006.01) |
| *H02K 17/16* | (2006.01) |

(52) U.S. Cl.
CPC ........... *H02K 7/116* (2013.01); *H02K 17/16* (2013.01); *F16H 1/28* (2013.01); *H02K 1/14* (2013.01); *H02K 1/24* (2013.01)

(58) Field of Classification Search
CPC . H02K 7/116; H02K 1/14; H02K 1/24; F16H 1/28

USPC ............... 310/83, 99, 49.47–49.49
See application file for complete search history.

(56) References Cited

U.S. PATENT DOCUMENTS

| | | | | |
|---|---|---|---|---|
| 5,581,138 | A * | 12/1996 | Tukamoto | F16H 21/40 310/38 |
| 7,211,016 | B2 | 5/2007 | Yan et al. | |
| 2006/0111214 | A1* | 5/2006 | Yan | F16H 1/46 475/5 |
| 2008/0185205 | A1* | 8/2008 | Kaminokado | B60K 6/26 180/220 |
| 2012/0032541 | A1* | 2/2012 | Chen | H02K 7/116 310/83 |

(Continued)

FOREIGN PATENT DOCUMENTS

| | | |
|---|---|---|
| TW | 200618448 | 6/2006 |
| TW | 201208237 A | 2/2012 |

(Continued)

OTHER PUBLICATIONS

TWM451744U1 (English Translation) (Year: 2013).*

*Primary Examiner* — Jermele M Hollington
*Assistant Examiner* — Alexander Moraza
(74) *Attorney, Agent, or Firm* — JMB Davis Ben-David

(57) ABSTRACT

An AC motor with a reduction mechanism is disclosed. The AC motor has a stator unit, a rotor unit, and a reduction transmission unit. An axial space of the AC motor can be substantially reduced by providing the reduction transmission unit directly built in the AC motor, and a path of the power transmission between the rotor unit and an output shaft can be reduced, so that the loss of the mechanical energy can be lowered.

6 Claims, 3 Drawing Sheets

(56) References Cited

U.S. PATENT DOCUMENTS

2013/0162088 A1* 6/2013 Shimizu .................. H02K 1/06
                                                    310/156.01
2014/0319948 A1   10/2014 Nagase et al.

FOREIGN PATENT DOCUMENTS

| TW | M451744 A | 4/2013 |
| TW | M451744 U1 * | 4/2013 |
| WO | 2013085056 A1 | 6/2013 |

* cited by examiner

AC MOTOR WITH REDUCTION MECHANISM

CROSS REFERENCE TO RELATED APPLICATIONS

This application is a continuation in part application of U.S. patent application Ser. No. 14/304,956, filed on Jun. 15, 2014, the disclosure of which is incorporated herein by reference.

FIELD OF INVENTION

The present disclosure relates to an alternating current (AC) motor, and more particularly to an AC motor with a reduction mechanism.

BACKGROUND OF INVENTION

In industry, motors generally are used for generating power, and gear reducers are used as a means for transmission shifting. A motor combines with a gear reducer for improving a torque of the motor or reducing the speed. The motor and the gear reducer must be matched based on work load, working speed, and maintaining motor operation at the most efficient operating point, in order to achieve better operating characteristics for the motor. A machine system can be divided into three main sub-systems, namely the power source, the transmission, and the working machine to transform the power into mechanical energy to achieve the desired functions. The electric motors and gear mechanisms are wildly used as power sources and transmissions, respectively. However they are designed separately. Traditionally, in order to combine the motors and gear trains, the couplings and other power transmission elements are used. And, the disadvantages of such design are longer power transmitting path, incompact space, and extra elements.

It is noted that cogging torque is the torque due to the interaction between the stator and the rotor core in a motor. The n-th harmonic components that cause the cogging torque are given by:

$$T_n = i \frac{T}{\gcd(P, T)}, i = 1, 2, 3, \dots$$

where gcd(P,T) is the greatest common divisor of the number of magnet poles P and the number of integrated gear-teeth T It is apparent that the order of the harmonic components that dominate the cogging torque is directly related to the number of gear teeth on the rotor and the number of magnet poles in a traditional AC motor.

FIG. 1 is a perspective view of a traditional AC motor 11 and a traditional gear reducer 12. The traditional AC motor 11 and the traditional gear reducer 12 are separated, and connected by the Intermediary mechanical components. Such as couplings or power-transmitting elements, are further employed for transmitting motion and/or power from the electric motor to the gear reducer. An output shaft 111 of the motor 11 is engaged with an input member 121 of the gear reducer 12 so that the output torque of the motor 11 is delivered to the gear reducer 12.

However, it suffers from significant disadvantages, such as the use of couplings or power-transmitting elements, which is the primary failure source and increases the maintenance complexity and manufacturing costs. The additional mechanical loss caused by the friction of intermediary components results in undesirable low efficiency. In addition, the output torque of the motor 11 is delivered to the gear reducer 12 through the coupling, and a path of the power transmission between the motor 11 and the gear reducer 12 is longer, and a friction of the coupling losses additional mechanical energy, resulting in lower efficiency. The motor 11 and the gear reducer 12 are independently design and manufactured. The transmission components, racks, and lock parts are provided to combine the motor 11 and the gear reducer 12, which increases manufacturing and maintenance costs, so that the accuracy of the system is reduced. Moreover, the volume of the motor 11 and the gear reducer 12 is large and difficult to change so that the installation space can't be planted.

As a result, it is necessary to provide a developed alternating current (AC) motor to solve the problems existing in the conventional technologies, as described above.

SUMMARY OF INVENTION

A primary object of the present disclosure is to provide an AC motor with a reduction mechanism, wherein the AC motor comprises a stator unit, a rotor unit, and a reduction transmission unit. The stator unit includes a stator body having an inner annular surface and an outer annular surface, a plurality of outer tooth portions formed on the outer annular surface of the stator body, a plurality of stator salient poles disposed on the inner annular surface of the stator body, and a plurality of stator coils wound on the stator salient poles, respectively. The rotor unit includes a rotor body having a front portion and a rear portion extended form the front portion, a plurality of rotor salient poles formed on the rear portion of the rotor body, and a plurality of rotor coils wound on the rotor salient poles, respectively, and configured to induct with the stator salient poles. The reduction transmission unit includes at least one transmission gear engaged with the outer tooth portions of the stator unit, a transmission shaft assembled to the transmission gear, an actuation arm including a first end assembled to the front portion of the rotor body and a second end assembled to the transmission shaft, and an output shaft assembled to the first end of the actuation arm. The transmission gear rotates around the outer tooth portions of the stator unit through the actuation arm, and the rotor body is configured to drive the actuation arm to actuate the output shaft to rotate.

In one embodiment of the present disclosure, the reduction transmission unit further comprises a first transmission gear engaged with the outer tooth portions of the stator unit and assembled to a first end of the transmission shaft, a second transmission gear assembled to a second end of the transmission shaft, and an output gear engaged with the second transmission gear and assembled on the output shaft.

In one embodiment of the present disclosure, a tooth number of the second transmission gear is less than that of the first transmission gear, and the first and second transmission gears are pivotally connected to and coaxially installed on the other end of the actuation arm.

In one embodiment of the present disclosure, the AC motor further comprises a case covered on the stator unit, the rotor unit, and the reduction gear unit, wherein the case has a base and a cover combined with the base, the stator body is disposed in the base, and the output shaft is extended out of the cover.

In one embodiment of the present disclosure, the AC motor further comprises an assembly piece, a projection formed on the assembly piece, and a shell installed between the assembly piece and the cover and configured to accommodate the stator unit, the rotor unit, and the reduction transmission unit, wherein the stator body is installed on the projection.

In one embodiment of the present disclosure, each of stator salient poles includes a neck portion wound by the corresponding stator coil and a head portion extended from the neck portion.

As described above, the reduction transmission unit can be installed in the AC motor by integrating with the reduction transmission unit and the AC motor as a reduction mechanism so that the axial space of the AC motor can be substantially reduced, the path of the power transmission between the rotor unit and an output shaft can be reduced, and the loss of the mechanical energy can be lowered. In addition, by such designs, the first transmission gear rotates around the outer tooth portions of the stator unit through the actuation arm, the rotor body is configured to drive the actuation arm to actuate the output shaft to rotate, and the reduction transmission unit transmitted by the planetary gears so that the output shaft and the rotor body are coaxially rotated, homeostatic characteristics can be correct.

DETAILED DESCRIPTION OF PREFERRED EMBODIMENTS

The structure and the technical means adopted by the present disclosure to achieve the above and other objects can be best understood by referring to the following detailed description of the preferred embodiments and the accompanying drawings. Furthermore, directional terms described by the present disclosure, such as upper, lower, front, back, left, right, inner, outer, side, longitudinal/vertical, transverse/horizontal, and etc., are only directions by referring to the accompanying drawings, and thus the used directional terms are used to describe and understand the present disclosure, but the present disclosure is not limited thereto.

Figure 1:
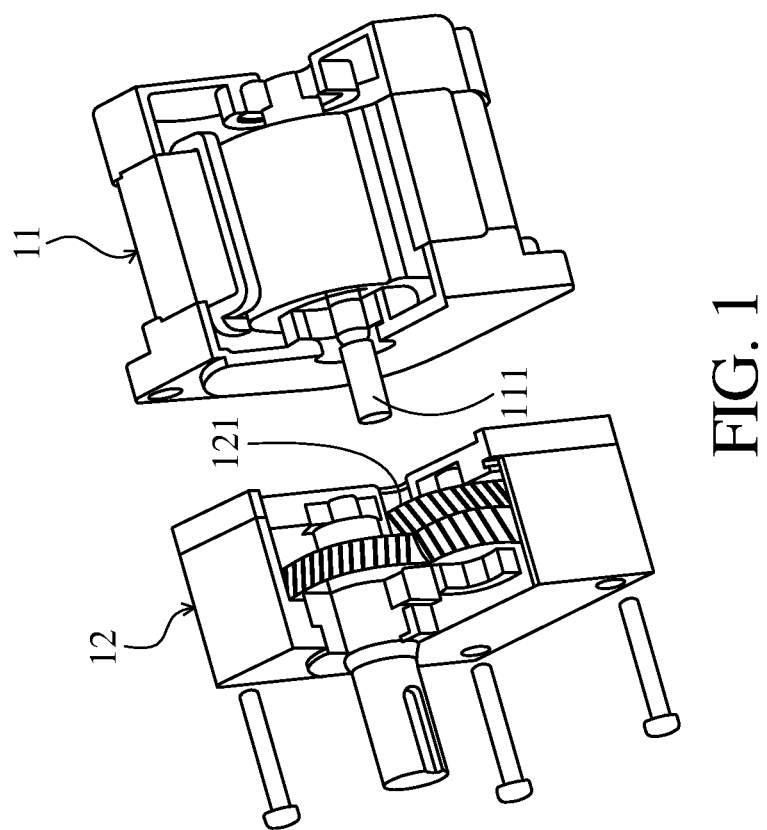
FIG. 1 is a perspective view of a traditional AC motor and a traditional gear reducer.
Figure 2:
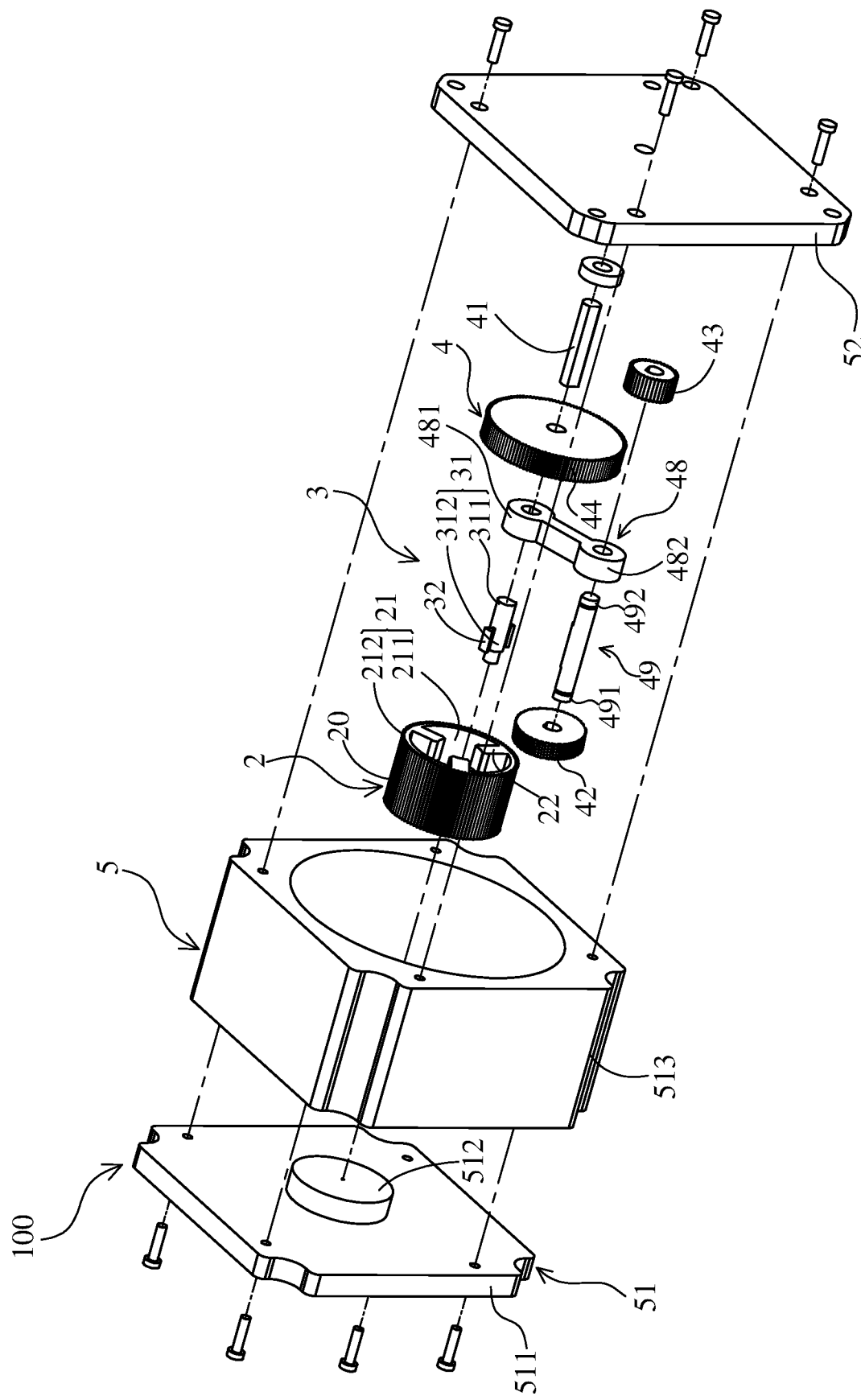
FIG. 2 is an exploded perspective view of the AC motor with reduction according to a preferred embodiment of the present disclosure.

Referring to FIG. 2, an AC motor 100 according to a preferred embodiment of the present disclosure is illustrated. The AC motor 100 comprises a stator unit 2, a rotor unit 3, a reduction transmission unit 4, and a case 5, wherein the stator unit 2, the rotor unit 3 and the reduction transmission unit 4 are integrated in the case 5 of the AC motor 100. The detailed structure of each component, assembly relationships and principle of operation in the present disclosure will be described in detail thereinafter.

Referring to FIG. 2, the case 5 is covered on the stator unit 2, the rotor unit 3 and the reduction gear unit 4, wherein the case 5 has a base 51 and a cover 52. The base 51 comprises an assembly piece 511, a projection 512 and a shell 513. The projection 512 formed on the assembly piece 511, and the shell 513 is combined between the assembly piece 511 and cover 52 through fastening bolts, and configured to accommodate the stator unit 2, the rotor unit 3 and the reduction transmission unit 4.

Figure 3:
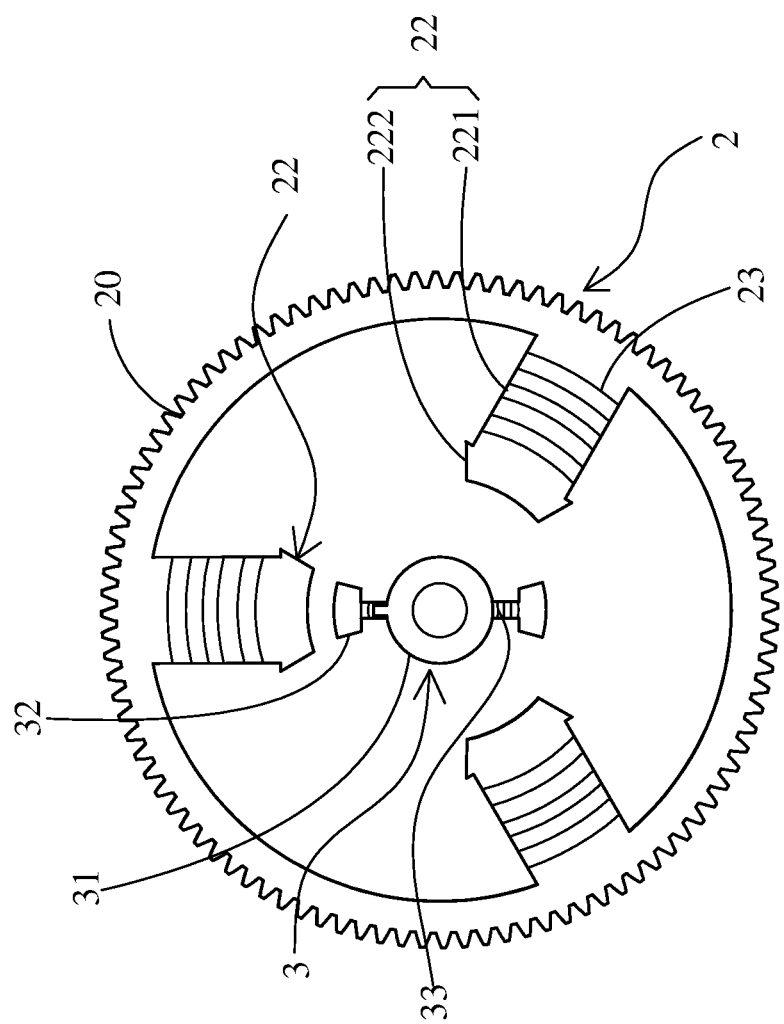
FIG. 3 is a cross-sectional view of the AC motor with reduction according to the preferred embodiment of the present disclosure.

Referring to FIGS. 2 and 3, the stator unit 2 has a stator body 21, a plurality of stator salient poles 22, a plurality of stator coils 23, and a plurality of outer tooth portions 20. The stator body 21 is disposed on the base 51, and includes an inner annular surface 211 embedded on the projection 512 and an outer annular surface 212. The stator salient poles 22 are disposed on the inner annular surface 211 of the stator body 21, wherein the stator salient poles 22 are spaced from each other. The stator coils 23 are wound on the stator salient poles, respectively. The outer tooth portions 20 are formed on the outer annular surface 212 of the stator body 21. In addition, each of stator salient poles 22 includes a neck portion 221 wound by the corresponding stator coil 23 and a head portion 222 extended from the neck portion 221.

Referring to FIGS. 2 and 3, the rotor unit 3 has a rotor body 31, a plurality of rotor salient poles 32 and a plurality of rotor coils 33. The rotor body 31 includes a front portion 311 and a rear portion 312 extended form the front portion 311. The rotor salient poles 32 are spindle-shaped and formed on the rear portion 312 of the rotor body 31. The rotor coils 33 are wound on the rotor salient poles 32, respectively, and configured to induct with the stator salient poles 22.

Referring to FIGS. 2 and 3, the reduction transmission unit 4 has an output shaft 41, a first transmission gear 42, a second transmission gear 43, an output gear 44, an actuation arm 48 and a transmission shaft 49. The actuation arm 48 includes a first end 481 assembled to the front portion 311 of the rotor body 31 and a second end 482 assembled to the transmission shaft 49. The output shaft 41 is assembled to the first end 481 of the actuation arm 48 and configured to rotate by the rotor body 31. The first transmission gear 42 is engaged with the outer tooth portions 22 of the stator unit 2, and assembled to a first end 491 of the transmission shaft 49. The second transmission gear 43 is assembled to a second end 492 of the transmission shaft 49. The output gear 44 is engaged with the second transmission gear 43 and assembled on the output shaft 41. In the preferred embodiment, a tooth number of the second transmission gear 43 is less than that of the first transmission gear 42, and the first and second transmission gears 42, 43 are pivotally connected to and coaxially installed on the first end 491 and the second end 492, respectively. The center of the actuation arm 49 is pivotally connected on the second end 482 of the actuation arm 48, so that the first and second transmission gears 42, 43 can be rotated by the actuation arm 48. In addition, the output gear 44 is engaged with the second transmission gear 43 and installed on the output shaft 41, and the output shaft 41 is extended out of the cover 5.

According to the described structure, when the stator coils 23 and the rotor coils 33 of the AC motor 100 are conducted, the rotor body 31 is rotated by mutual exclusion so that the first and second transmission gears 42, 43 are in synchronous revolution by the actuation arm 48. The first transmission gear 42 is engaged with the outer tooth portions 22 of the stator unit 2, and the outer tooth portions 22 is fixed so that the first transmission gear 42 is rotated. The second transmission gear 43 is coaxially rotated by the first transmission gear 42 through the actuation arm 49, and the output gear 44 is actuated to rotate by the second transmission gear 43 so that the output shaft 41 is synchronously rotated and the output power of the AC motor 100 can be reduced. In addition, the first and second transmission gears 42, 43 are located at two sides of the actuation arm 48 respectively, so that the revolution and rotation can be balanced in two planetary gears, and the actuation arm 48 will not be broken by focused torque.

Furthermore, the number of gear-teeth on the outer tooth portions 20 and the number of magnet poles are two important cogging torque design parameters. This is why electric motors with fractional slot-to-pole ratios are frequently employed by experienced motor designers to reduce the cogging torque. The fractional slot-to-pole ratios have higher orders of dominant harmonic cogging torque components. The magnitude of the harmonic component usually decreases in accordance with the increase in the order number. The strategy for reducing the cogging torque is to make the dominant harmonic components have a higher order number. By integrating different numbers of gear-teeth, the number of slots is replaced by the number of teeth. The gear teeth act as dummy slots in the magnetic field, which can increase the order number of the dominant harmonic components. Therefore, to compare the performance between the existing AC induction motor and the AC motor of the present disclosure, the torque ripple is reduced by 14.23%, and the torque density, which is the output torque per unit volume, is increased by 1.75%. The results show that although the average torque is reduced, the AC motor of the present disclosure can provide more stable and efficient output torque than other options.

By such designs, the first transmission gear 42 rotates around the outer tooth portions 20 of the stator unit 2 through the actuation arm 48, the rotor body 31 is configured to drive the actuation arm 48 to actuate the output shaft 41 to rotate, and the reduction transmission unit 4 transmitted by the planetary gears so that the output shaft 41 and the rotor body 31 are coaxially rotated, homeostatic characteristics can be correct.

As described above, the reduction transmission unit 4 and the AC motor 100 of the present disclosure are integrated so that the reduction transmission unit 4 can be installed in the case 5 as a reduction mechanism. Thus, the transmission components, the racks and the lock parts of the prior art do not need to be further used, so that the structure of the AC motor 100 of the present disclosure is lightweight and easily maintained. In addition, the stator unit 2, the rotor unit 3 and the reduction transmission unit 4 of the present disclosure are combined (e.g. the outer tooth portions 30 are engaged with the first transmission gear 42), so that the elements can be simplified and the axial space of the AC motor can be substantially reduced. Moreover, the path of the power transmission between the rotor unit 3 and the output shaft 41 can be reduced, and the loss of the mechanical energy can be lowered.

The present disclosure has been described with a preferred embodiment thereof and it is understood that many changes and modifications to the described embodiment can be carried out without departing from the scope and the spirit of the invention that is intended to be limited only by the appended claims.

What is claimed is:

1. An AC motor with a reduction mechanism, comprising:
    a stator unit including:
        a stator body having an inner annular surface and an outer annular surface;
        a plurality of outer tooth portions formed on the outer annular surface of the stator body;
        a plurality of stator salient poles disposed on the inner annular surface of the stator body; and
        a plurality of stator coils wound on the stator salient poles, respectively;
    a rotor unit including:
        a rotor body having a front portion and a rear portion extended from the front portion;
        a plurality of rotor salient poles formed on the rear portion of the rotor body; and
        a plurality of rotor coils wound on the rotor salient poles, respectively, and configured to induct with the stator salient poles; and
    a reduction transmission unit including:
        at least one transmission gear engaged with the outer tooth portions of the stator unit;
        a transmission shaft assembled to the transmission gear;
        an actuation arm including a first end assembled to the front portion of the rotor body and a second end assembled to the transmission shaft; and
        an output shaft assembled to the first end of the actuation arm;
    wherein the transmission gear rotates around the outer tooth portions of the stator unit through the actuation arm, and the rotor body is configured to drive the actuation arm to actuate the output shaft to rotate.

2. The AC motor according to claim 1, wherein the reduction transmission unit further comprises:
    a first transmission gear engaged with the outer tooth portions of the stator unit and assembled to a first end of the transmission shaft;
    a second transmission gear assembled to a second end of the transmission shaft; and
    an output gear engaged with the second transmission gear and assembled on the output shaft.

3. The AC motor according to claim 2, wherein a tooth number of the second transmission gear is less than that of the first transmission gear, and the first and second transmission gears are pivotally connected to and coaxially installed on the other end of the actuation arm.

4. The AC motor according to claim 1, wherein the AC motor further comprises:
    a case covered on the stator unit, the rotor unit, and the reduction gear unit, wherein the case has a base and a cover combined with the base, the stator body is disposed in the base, and the output shaft is extended out of the cover.

5. The AC motor according to claim 4, wherein the AC motor further comprises:
    an assembly piece;
    a projection formed on the assembly piece; and
    a shell installed between the assembly piece and the cover and configured to accommodate the stator unit, the rotor unit, and the reduction transmission unit, wherein the stator body is installed on the projection.

6. The AC motor according to claim 1, wherein each of stator salient poles includes a neck portion wound by the corresponding stator coil and a head portion extended from the neck portion.

* * * * *